(12) United States Patent
Roscoe (10) Patent No.: US 8,575,916 B2
(45) Date of Patent: Nov. 5, 2013

(54) METHOD, SYSTEM, AND APPARATUS FOR DETECTING AN ARC EVENT USING BREAKER STATUS

(75) Inventor: George William Roscoe, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 12/962,771

(22) Filed: Dec. 8, 2010

(65) Prior Publication Data

US 2012/0146623 A1 Jun. 14, 2012

(51) Int. Cl.
*G01R 31/08* (2006.01)
(52) U.S. Cl.
USPC ........................................ 324/103 R; 324/536
(58) Field of Classification Search
USPC ................. 361/5, 6; 324/103 R, 117
See application file for complete search history.

(56) References Cited

U.S. PATENT DOCUMENTS

| 7,292,422 | B2 * | 11/2007 | Culligan et al. ............. 361/93.2 |
| 7,440,245 | B2 * | 10/2008 | Miller et al. .................... 361/42 |
| 7,580,232 | B2 * | 8/2009 | Caggiano et al. ................. 361/5 |
| 7,599,161 | B2 * | 10/2009 | Premerlani et al. ............ 361/62 |
| 7,747,354 | B2 | 6/2010 | Papallo et al. |
| 7,791,846 | B2 * | 9/2010 | Roscoe et al. .................... 361/2 |
| 2008/0198521 | A1 * | 8/2008 | Weiher et al. ................... 361/64 |
| 2010/0164503 | A1 * | 7/2010 | Sawhney et al. .............. 324/512 |

* cited by examiner

*Primary Examiner* — Arleen M Vazquez
*Assistant Examiner* — Robert Alejnikov, Jr.
(74) *Attorney, Agent, or Firm* — General Electric Company (57) ABSTRACT

A power equipment protection system includes a first circuit monitoring device configured to monitor a first circuit, a second circuit monitoring device configured to monitor a second circuit that is electrically coupled to the first circuit, and a processor communicatively coupled to the first circuit monitoring device and the second circuit monitoring device. The processor is configured to receive a signal indicative of a fault from at least one of the first circuit monitoring device and the second circuit monitoring device, determine whether the fault occurred in the first circuit or in the second circuit, and if the fault occurred in the second circuit, determine whether the fault is an arc event.

20 Claims, 5 Drawing Sheets

METHOD, SYSTEM, AND APPARATUS FOR DETECTING AN ARC EVENT USING BREAKER STATUS

BACKGROUND OF THE INVENTION

The embodiments described herein relate generally to arc flash detection and mitigation and, more particularly, to arc flash detection systems for use in reducing nuisance detections.

At least some known electric distribution circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. For example, the insulation between the conductors can become ionized, which makes the insulation conductive and enables formation of an arc flash.

An arc flash includes a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker may not trip or may exhibit a delayed trip unless the circuit breaker is specifically designed to handle an arc fault condition.

Light sensors may be used to detect the presence of light emitted during an arc flash. However, such sensors are often sensitive to low light levels such that they also detect non-arc-flash light and trigger a "nuisance trip" of a circuit protection device. For example, a typical arc flash event can product light in with luminous flux on the order of 100,000 lux at a distance of three to four feet from the arc flash event, while known light sensors generally saturate at 700 lux or less. Light emitted by a circuit breaker during a trip, by space lighting, or by direct sunlight may cause the light sensor to falsely detect an arc flash event. Thus, there is a need for an arc flash detection system that reliably detects arc flash events and mitigates nuisance trips of circuit protection devices.

BRIEF DESCRIPTION OF THE INVENTION

In one aspect, a power equipment protection system includes a first circuit monitoring device configured to monitor a first circuit, a second circuit monitoring device configured to monitor a second circuit that is electrically coupled to the first circuit, and a processor communicatively coupled to the first circuit monitoring device and the second circuit monitoring device. The processor is configured to receive a signal indicative of a fault from at least one of the first circuit monitoring device and the second circuit monitoring device, determine whether the fault occurred in the first circuit or in the second circuit, and if the fault occurred in the second circuit, determine whether the fault is an arc event.

In another aspect, a controller is provided for use with a power equipment protection system. The controller is configured to be communicatively coupled to a first circuit monitoring device configured to monitor a first circuit, and be communicatively coupled to a second circuit monitoring device configured to monitor a second circuit electrically coupled to the first circuit. The controller is further configured to receive a signal indicative of a fault from at least one of the first circuit monitoring device and the second circuit monitoring device, determine whether the fault occurred in the first circuit or in the second circuit, and if the fault occurred in the second circuit, determine whether the fault is an arc event.

In another aspect, a method is provided for protecting power equipment having at least one first circuit and a second circuit. The method includes receiving, by a processor from at least one circuit monitoring device, a signal indicative of a fault, and determining whether the fault occurred in the at least one first circuit or in the second circuit. If the fault occurred in the second circuit, the processor determines whether the fault is an arc event based on a voltage level measured across a plurality of conductors of the second circuit, and if the fault is an arc event, the processor generates a signal to activate a circuit protection device.

DETAILED DESCRIPTION OF THE INVENTION

Exemplary embodiments of systems, methods, and apparatus for use in protecting power distribution equipment or other electrical equipment from faults are described herein. These embodiments facilitate continuous operation of an equipment protection system. Moreover, these embodiments enable through-faults that occur on branch circuits to be handled normally using a feeder circuit breaker, for example. A through-fault, as used herein, is a fault that occurs in a distribution system outside of a protected zone where all or some of the fault current flows through the protected zone. Such through-faults do not typically require diversion of arc flash energy but, rather, can be eliminated by causing a feeder circuit breaker to trip, while continuing monitoring of a main power feed to detect an arc flash. The embodiments described herein enable through-faults to be detected, and enable circuit protection devices to be activated upon their detection. Furthermore, these embodiments enable reliable detection of arc events while reducing nuisance trips that can be caused by light-based detection systems.

Figure 1:
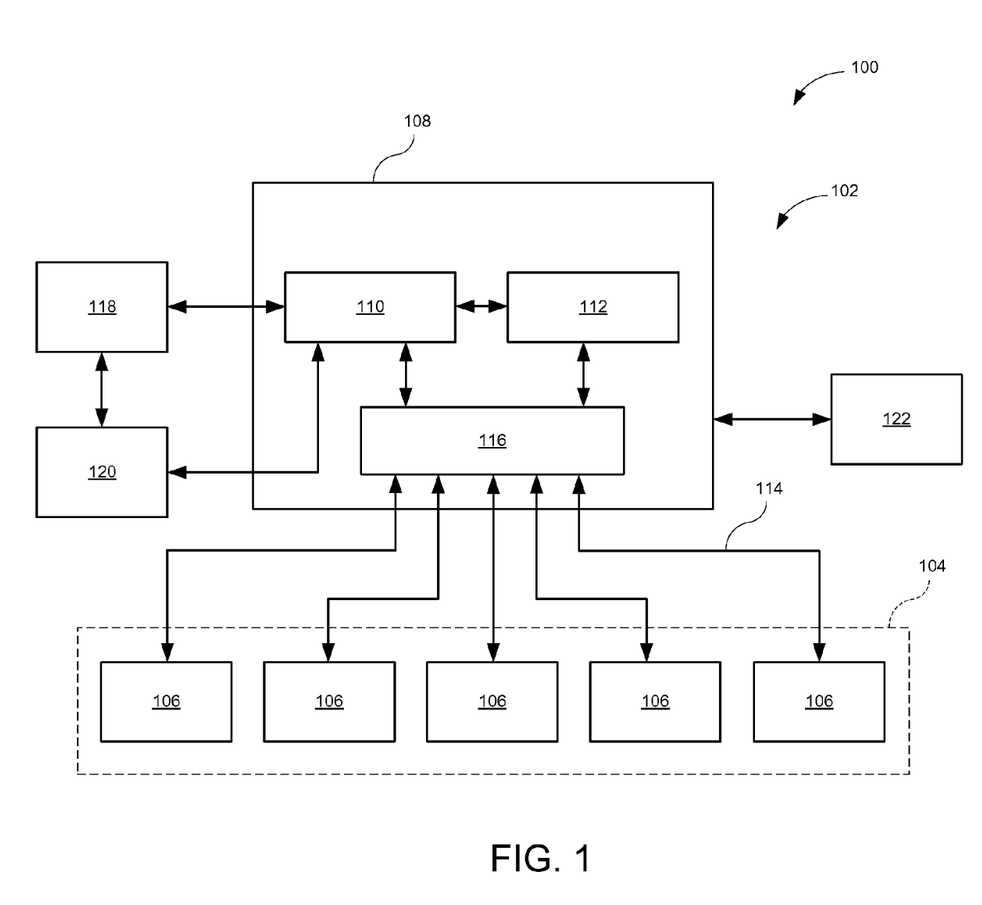
FIG. 1 is a schematic block diagram of an exemplary power system.

FIG. 1 is a schematic block diagram of an exemplary power system 100 that includes an equipment protection system 102 and a distribution system 104. In an exemplary embodiment, distribution system 104 includes a plurality of switchgear units 106. Protection system 102 includes a central controller 108 that includes a processor 110 and a memory area 112 coupled to processor 110. Processor 110 controls and/or monitors operation of switchgear units 106. More specifically, processor 110 controls and/or monitors operation of a plurality of circuit breakers and trip units (neither shown in FIG. 1) within switchgear units 106. Processor 110 communicates with switchgear units 106 via a network 114. For example, central controller 108 includes a central communication unit 116 that enables transmitting and receiving data and/or commands between processor 110 and switchgear units 106 via network 114.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Moreover, memory area 112 stores program code and instructions, executable by processor 110, to control and/or monitor switchgear units 106. Memory area 112 may include one, or more than one, forms of memory. For example, memory area 112 can include random access memory (RAM), which can include non-volatile RAM (NVRAM), magnetic RAM (MRAM), ferroelectric RAM (FeRAM) and other forms of memory. Memory area 112 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 112. Memory area 112 may also be, or include, a detachable or removable memory, including, but not limited to, a suitable cartridge, disk, CD ROM, DVD or USB memory.

Moreover, in an exemplary embodiment of FIG. 1, protection system 102 includes a display device 118 and a user input device 120 that provide a user interface for monitoring and controlling distribution system 104 using protection system 102. Display device 118 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, display device 118 includes a touch-screen with an associated touch-screen controller. Display device 118 may be of any suitable configuration, such as a square, a rectangle or an elongated rectangle.

Furthermore, equipment protection system 102 includes a circuit protection device 122 that is communicatively coupled to controller 108. Circuit protection device 122 may be an arc containment device that initiates a secondary arc within a self-contained apparatus to divert energy away from a first arc, such as an arc flash, that occurs a fault point within distribution system 104. Alternatively, circuit protection device 122 may be a crowbar device that diverts energy away from a fault point within distribution system 104 into a bolted fault.

Figure 2:
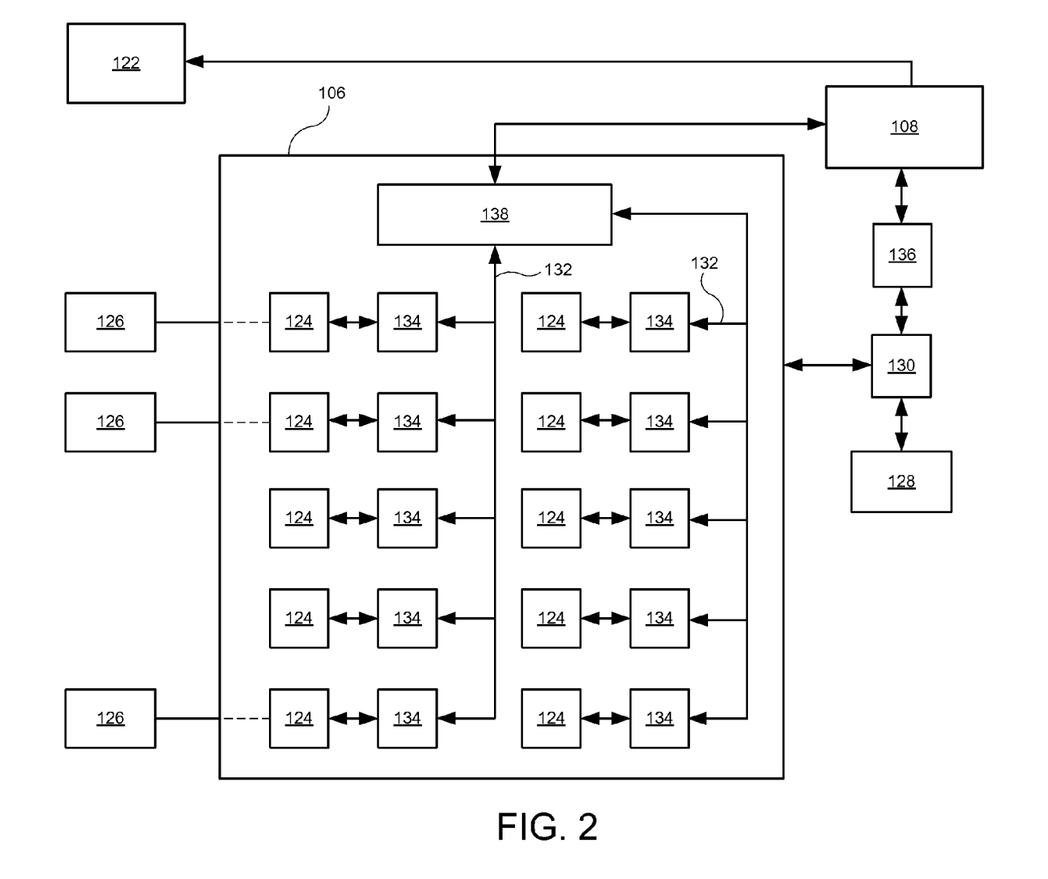
FIG. 2 is a schematic block diagram of an exemplary power distribution system that may be used with the power system shown in FIG. 1.

FIG. 2 is a schematic block diagram of power distribution system 104. More specifically, FIG. 2 is a schematic block diagram of switchgear unit 106. In an exemplary embodiment, switchgear unit 106 includes a plurality of first circuit breakers, or a plurality of feeder circuit breakers 124, or other circuit switches or interruptors. Each feeder circuit breaker 124 is removably coupled within switchgear unit 106 and is configured to control power to one or more loads 126. Loads 126 may include, but are not limited to only including, machinery, motors, lighting, and/or other electrical and mechanical equipment of a manufacturing or power generation or distribution facility. Power is provided to switchgear unit 106 from a second circuit, such as a main power feed 128, which is also coupled to a second circuit breaker, or main circuit breaker 130. The power is then divided into a plurality of first circuits, or a plurality of branch circuits 132, using feeder circuit breakers 124 for providing power to loads 126.

Each feeder circuit breaker 124 is coupled to a corresponding feeder trip unit 134. Moreover, main circuit breaker 130 is coupled to a main trip unit 136. In an exemplary embodiment, feeder trip units 134 and main trip unit 136 are also communicatively coupled to controller 108. For example, feeder trip units 134 and main trip unit 136 may be directly coupled for communication with controller 108, or may be coupled for communication with controller 108 via a communication unit 138. Moreover, communication between feeder trip units 134, main trip unit 136, and controller 108 may be provided via a hardwired communication link or via a wireless communication link. Trip units 134 and 136 collect operation data relating to a corresponding circuit breaker. For example, feeder trip units 134 may gather operation data by obtaining a current level through a respective conductor of branch circuit 132 that is monitored by each feeder circuit breaker 134, a voltage level across a plurality of conductors of branch circuit 132 that is monitored by feeder circuit breaker 134, and/or a breaker status of feeder circuit breaker 134. Similarly, main trip unit 136 may gather operation data by obtaining a current level through a respective conductor of main power feed 128 that is monitored by main circuit breaker 130, a voltage level across a plurality of conductors of main power feed 128 that are monitored by main circuit breaker 130, and/or a breaker status of main circuit breaker 130. In some embodiments, feeder trip units 134 and/or main trip unit 136 periodically receive the operation data at a preselected frequency. Moreover, in some embodiments, feeder trip units 134 and/or main trip unit 136 include a memory area (not shown) that can store operation data for a certain period of time.

Figure 3:
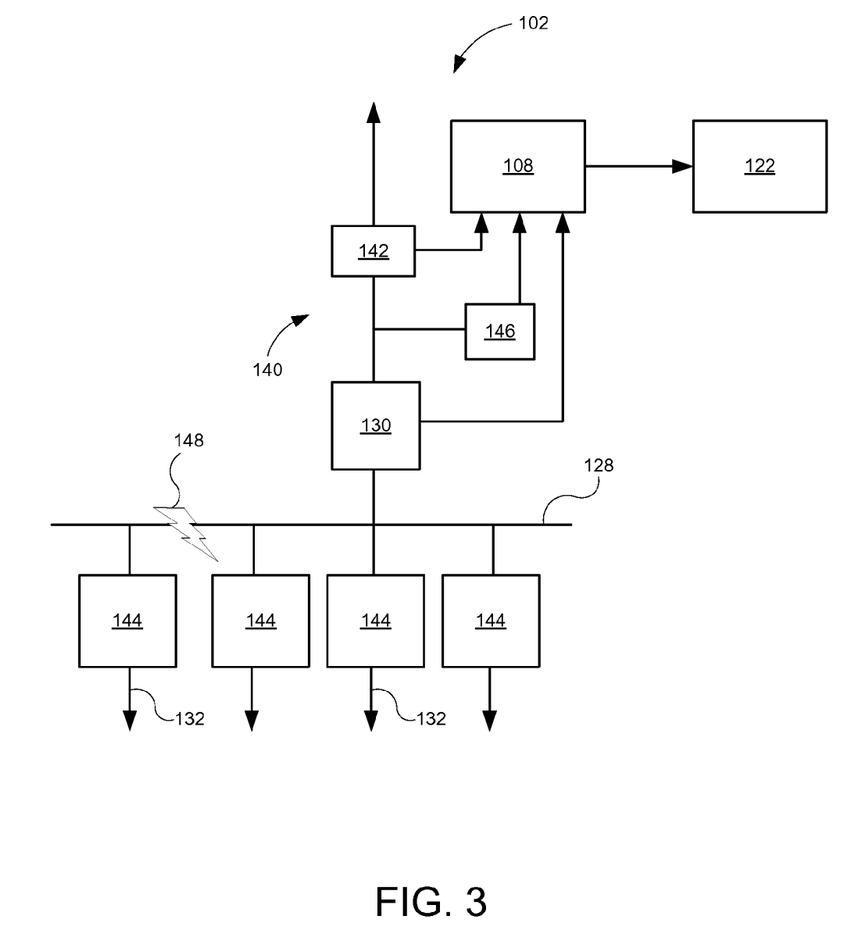
FIGS. 3 and 4 are schematic diagrams of an equipment protection system that may be used with the power system shown in FIG. 1.
Figure 4:
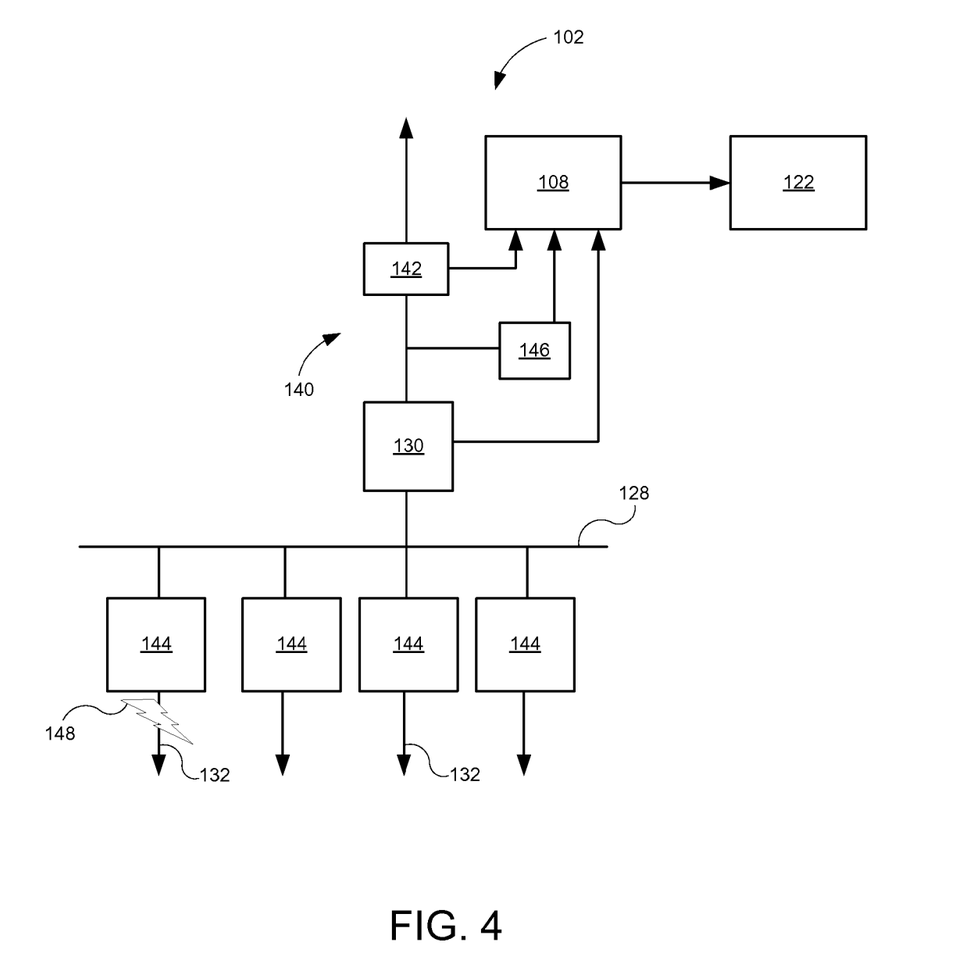

FIGS. 3 and 4 are schematic diagrams of equipment protection system 102. In an exemplary embodiment, equipment protection system 102 includes controller 108 and monitoring devices for use in detecting circuit faults that occur within switchgear 106 (shown in FIGS. 1 and 2). For example, a second circuit monitoring device, such as a main circuit monitoring device 140, monitors main power feed 128 to detect an overcurrent condition through main power feed 128 and/or one or more branch circuits 132. Main circuit monitoring device 140 may be main circuit breaker 130 or a current sensor 142. Similarly, a first circuit monitoring device, such as a feeder circuit monitoring device 144, monitors each branch circuit 132 to detect an overcurrent condition. In an exemplary embodiment, feeder circuit monitoring device 144 is feeder circuit breaker 124 (shown in FIG. 2). Alternatively, feeder circuit monitoring device 144 may be a current sensor (not shown).

Equipment protection system 102 also includes a voltage sensor 146 that is communicatively coupled to controller 108. Voltage sensor 146 measures a voltage level, such as a first voltage level, across a plurality of conductors of main power feed 128, such as between two phase lines of main power feed 128, or between a phase line and ground or a neutral line. Voltage sensor 146 also generates a signal proportional to the measured voltage level and transmits the signal to controller 108.

During operation, either main circuit monitoring device 140 or feeder circuit monitoring device 144, or both, detects an overcurrent condition, or fault 148, in a circuit. For example, feeder circuit monitoring device 144 may detect fault 148 in branch circuit 132. Alternatively, main circuit monitoring device 140 may detect fault 148 in branch circuit 132 or in main power feed 128. Main circuit monitoring device 140 or feeder circuit monitoring device 144 transmits a signal to controller 108 that is indicative of the fault detection. In response to the signal, controller 108 determines whether fault 148 occurred in branch circuit 132 or in main power feed 128. If fault 148 occurred in branch circuit 132, controller 108 may cause feeder circuit breaker 124 to trip, for example. However, if fault 148 occurred in main power feed 128, controller 108 determines whether fault 148 is an arc event. Controller 108 determines whether fault 148 is an arc event based in part on the signal received from voltage sensor 146. If fault 148 is determined to be an arc event, controller 108 provides a signal to activate circuit protection device 122 to enable energy associated with the arc event to be removed from the site of fault 148 to protect the equipment.

Figure 5:
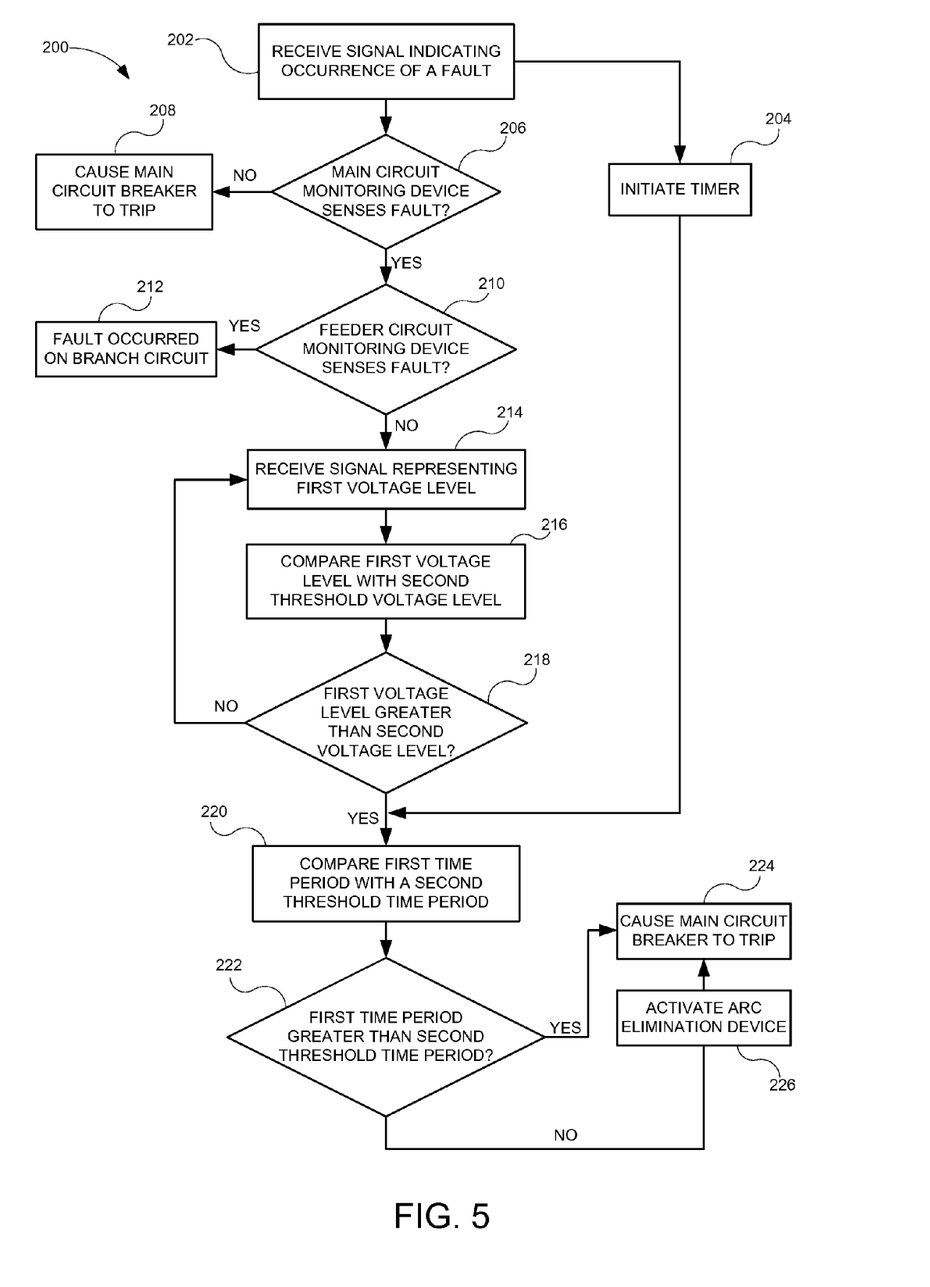
FIG. 5 is a flowchart that illustrates an exemplary method for protecting power equipment using the equipment protection system shown in FIGS. 3 and 4.

FIG. 5 is a flowchart 200 that illustrates an exemplary method for protecting power equipment, such as switchgear 106 (shown in FIGS. 1 and 2), using equipment protection system 102 (shown in FIGS. 1-4). Referring to FIGS. 3 and 4, and in an exemplary embodiment, controller 108 receives 202 a signal indicating that a fault, such as fault 148, has occurred. Controller 108 may receive the signal from main circuit monitoring device 140 or from feeder circuit monitoring device 144. Upon receiving the signal, controller 108 initiates 204 a timer.

Moreover, upon receiving the signal, controller 108 determines whether fault 148 occurred on main power feed 128 or on branch circuit 132. For example, controller 108 determines 206 whether main circuit monitoring device 140 detects an overcurrent condition that is associated with fault 148. If main circuit monitoring device 140 does not detect the overcurrent condition, controller 108 may cause 208 main circuit breaker 130 to trip. However, if main circuit monitoring device 140 detects the overcurrent condition, controller 108 determines 210 whether feeder circuit monitoring device 144 detects the overcurrent condition associated with fault 148. If feeder circuit monitoring device 144 detects the overcurrent condition, controller 108 determines 212 that fault 148 has occurred on branch circuit 132, as shown in FIG. 4, and causes feeder circuit breaker 124 (shown in FIG. 2) to trip. Alternatively, controller 108 may use a different method of eliminating fault 148.

However, if feeder circuit monitoring device 144 does not detect the overcurrent condition, controller 108 determines that fault 148 has occurred on main power feed 128, as shown in FIG. 3. Accordingly, controller 108 determines whether fault 148 is an arc event. For example, controller 108 receives 214 from voltage sensor 146 a signal that is representative of a first voltage level across a plurality of conductors of main power feed 128, such as between two phase lines of main power feed 128, or between a phase line and ground or a neutral line. Controller 108 compares 216 the first voltage level with a preselected or predetermined second threshold voltage level that may be stored in memory area 112 (shown in FIG. 1). If controller 108 determines 218 that the first voltage level is not greater than (i.e., is less than or equal to) the second threshold voltage level, controller 108 continues to receive 214 subsequent measurements of the first voltage level from voltage sensor 146.

However, if controller 108 determines 218 that the first voltage level is greater than the second threshold voltage level, controller 108 compares 220 a first time period to a second threshold time period that may be stored in memory area 112. The first time period may be defined by a time period between when controller 108 receives 202 the signal indicating an occurrence of fault 148 and when controller 108 determines 218 that the first voltage level is greater than the second threshold voltage level. The second time period may be based on an interruption time of main circuit breaker 130 or feeder circuit breaker 124. If controller 108 determines 222 that the first time period is not greater than (i.e., is less than or equal to) the second threshold time period, controller 108 causes 224 main circuit breaker 130 to trip. However, if controller 108 determines 222 that the first time period is greater than the second threshold time period, controller 108 provides a signal to activate 226 circuit protection device 122. Moreover, controller 108 may cause 224 main circuit breaker 130 to trip. For example, if the first time period is less than the second threshold time period and the first voltage level is greater than the second threshold voltage level, controller 108 determines that fault 148 is an arc event and provides a signal to activate 226 circuit protection device 122.

Exemplary embodiments of systems, methods, and apparatus for use in protecting power distribution equipment or other electrical equipment are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A controller, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary power equipment environment, embodiments of the invention are operational with numerous other general purpose or special purpose power equipment environments or configurations. The power equipment environment is not intended to suggest any limitation as to the scope of use or functionality of any aspect of the invention. Moreover, the power equipment environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power equipment protection system comprising:
    a first circuit monitoring device configured to monitor a first circuit;
    a second circuit monitoring device configured to monitor a second circuit that is electrically coupled to the first circuit; and
    a processor communicatively coupled to said first circuit monitoring device and said second circuit monitoring device, wherein said processor is configured to:
        receive a signal from at least one of said first circuit monitoring device and said second circuit monitoring device, the signal indicative of a fault;
        determine whether the fault occurred in the first circuit or in the second circuit; and
        if the fault occurred in the second circuit, determine whether the fault is an arc event based at least in part on a measured voltage level in the second circuit.

2. A power equipment protection system in accordance with claim 1, wherein said processor is configured to determine whether said second circuit monitoring device detects an overcurrent condition associated with the fault and whether said first circuit monitoring device detects the overcurrent condition.

3. A power equipment protection system in accordance with claim 2, wherein said processor is configured to determine that the fault occurred in the first circuit when said second circuit monitoring device and said first circuit monitoring device both detect the overcurrent condition.

4. A power equipment protection system in accordance with claim 2, wherein said processor is configured to determine that the fault occurred in the second circuit when said second circuit monitoring device detects the overcurrent condition and said first circuit monitoring device does not detect the overcurrent condition.

5. A power equipment protection system in accordance with claim 1, further comprising a voltage sensor communicatively coupled to said processor and configured to measure the voltage level across a plurality of conductors of the second circuit.

6. A power equipment protection system in accordance with claim 5, wherein said processor is further configured to receive a signal representative of the measured voltage level from said voltage sensor and to compare the measured voltage level to a threshold voltage level.

7. A power equipment protection system in accordance with claim 6, wherein said processor is configured to determine that the fault is an arc event when the measured voltage level is greater than the threshold voltage level.

8. A power equipment protection system in accordance with claim 1, further comprising a circuit protection device communicatively coupled to said processor, wherein said processor is further configured to generate a signal to activate said circuit protection device upon determining that the fault is an arc event.

9. A power equipment protection system in accordance with claim 1, wherein at least one of said first circuit monitoring device and said second circuit monitoring device comprises a circuit breaker.

10. A power equipment protection system in accordance with claim 1, wherein at least one of said first circuit monitoring device and said second circuit monitoring device comprises a current sensor.

11. A controller for use with a power equipment protection system, said controller configured to:
    be communicatively coupled to a first circuit monitoring device configured to monitor a first circuit;
    be communicatively coupled to a second circuit monitoring device configured to monitor a second circuit electrically coupled to the first circuit;
    receive a signal from at least one of the first circuit monitoring device and the second circuit monitoring device, the signal indicative of a fault;
    determine whether the fault occurred in the first circuit or in the second circuit; and
    if the fault occurred in the second circuit, determine whether the fault is an arc event based at least in part on a measured voltage level in the second circuit.

12. A controller in accordance with claim 11, wherein said controller is configured to determine whether the second circuit monitoring device detects an overcurrent condition associated with the fault and whether the first circuit monitoring device detects the overcurrent condition.

13. A controller in accordance with claim 12, wherein said controller is configured to determine that the fault occurred in the first circuit when the second circuit monitoring device and the first circuit monitoring device both detect the overcurrent condition.

14. A controller in accordance with claim 12, wherein said controller is configured to determine that the fault occurred in the second circuit when the second circuit monitoring device detects the overcurrent condition and the first circuit monitoring device does not detect the overcurrent condition.

15. A controller in accordance with claim 11, wherein said controller is further configured to:
    be communicatively coupled to a voltage sensor configured to measure the voltage level across a plurality of conductors of the second circuit;
    receive a signal representative of the measured voltage level from the voltage sensor;
    compare the measured voltage level to a threshold voltage level; and determine that the fault is an arc event when the measured voltage level is greater than the threshold voltage level.

16. A controller in accordance with claim 11, wherein said controller is further configured to:
be communicatively coupled to a circuit protection device; and
generate a signal to activate the circuit protection device upon determining that the fault is an arc event.

17. A method for protecting power equipment having a second circuit and at least one first circuit, said method comprising:
receiving, by a processor from at least one circuit monitoring device, a signal indicative of a fault;
determining whether the fault occurred in the at least one first circuit or in the second circuit;
if the fault occurred in the second circuit, determining whether the fault is an arc event based on a voltage level measured across a plurality of conductors of the second circuit; and
if the fault is an arc event, generating a signal to activate a circuit protection device.

18. A method in accordance with claim 17, wherein the processor is communicatively coupled to a second circuit monitoring device and a first circuit monitoring device, the second circuit monitoring device configured to monitor the second circuit and the first circuit monitoring device configured to monitor the at least one first circuit, wherein determining whether the fault occurred in the at least one first circuit or in the second circuit comprises:
determining whether the second circuit monitoring device detects an overcurrent condition associated with the fault and whether the first circuit monitoring device detects the overcurrent condition;
determining that the fault occurred in the at least one first circuit when the second circuit monitoring device and the first circuit monitoring device both detect the overcurrent condition; and
determining that the fault occurred in the second circuit when the second circuit monitoring device detects the overcurrent condition and the first circuit monitoring device does not detect the overcurrent condition.

19. A method in accordance with claim 17, wherein the processor is communicatively coupled to a voltage sensor that is configured to measure the voltage level across the plurality of conductors of the second circuit, and wherein determining whether the fault is an arc event comprises:
receiving a signal representative of the measured voltage level from the voltage sensor;
comparing the measured voltage level to a threshold voltage level; and
determining that the fault is an arc event when the voltage level is greater than the threshold voltage level.

20. A method in accordance with claim 19, further comprising initiating a timer upon receiving the signal indicative of the fault, wherein determining whether the fault is an arc event further comprises:
measuring a time period between receiving the signal and determining that the measured voltage level is greater than the threshold voltage level;
comparing the measured time period to a threshold time period; and
generating the signal to activate the circuit protection device when the measured time period is less than the threshold time period.

* * * * *